US006175725B1

(12) United States Patent
Auber

(10) Patent No.: US 6,175,725 B1
(45) Date of Patent: Jan. 16, 2001

(54) COMPLETE RADIO NAVIGATION RECEIVER, PARTICULARLY OF THE GPS TYPE

(75) Inventor: Jean-Claude Auber, Grosrouvre (FR)

(73) Assignee: Dassault Electronique, Saint Cloud (FR)

( * ) Notice: Under 35 U.S.C. 154(b), the term of this patent shall be extended for 0 days.

(21) Appl. No.: 09/165,407

(22) Filed: Oct. 2, 1998

(30) Foreign Application Priority Data

Oct. 2, 1997 (FR) .................................................. 97 12283

(51) Int. Cl.[7] ...................................................... H04Q 7/36
(52) U.S. Cl. .............. 455/130; 342/357.06; 342/357.01; 342/357.04; 455/456; 455/457; 455/67.1; 455/67.6; 375/130; 375/347
(58) Field of Search ......................... 342/357.06, 357.01, 342/357.04, 357.05; 455/456, 422, 457, 67.1, 67.6, 12.1, 130, 427; 340/988; 375/130, 347, 142

(56) References Cited

U.S. PATENT DOCUMENTS

| 4,797,677 | * | 1/1989 | Macdoran et al. | 342/357.06 |
|---|---|---|---|---|
| 5,347,536 | | 9/1994 | Meehan | 375/1 |
| 5,390,207 | | 2/1995 | Fenton et al. | 375/1 |
| 5,430,759 | | 7/1995 | Yokev et al. | 375/202 |
| 5,499,266 | | 3/1996 | Yokev et al. | 375/202 |
| 5,519,718 | | 5/1996 | Yokev et al. | 375/202 |
| 5,546,422 | | 8/1996 | Yokev et al. | 375/202 |
| 5,583,517 | | 12/1996 | Yokev et al. | 342/457 |
| 5,592,180 | | 1/1997 | Yokev et al. | 342/450 |
| 5,596,330 | | 1/1997 | Yokev et al. | 342/387 |
| 5,712,867 | | 1/1998 | Yokev et al. | 375/202 |

FOREIGN PATENT DOCUMENTS 0 488 739 B1  6/1992 (EP).
2 248 517  10/1973 (FR).
2 698 966  12/1992 (FR).

WO 95/14935  of 1995 (WO).
WO 97/06446  of 1997 (WO).

OTHER PUBLICATIONS

Parkinson et al., Techniques for Autonomous GPS Integrity Monitoring, pp. III–1–III–17, Stanford University, W. W Hansen Labs, GP–B, Via Palou, Stanford, California.
Brown, A Baseline RAIM Scheme and a Note on the Equivalence of Three RAIM Methods, Iowa State University, pp. 127–137.
Weill, Conquering Multipath: The GPS Accuracy Battle, California State University.
Sturza, Navigation System Integrity Monitoring Using Redundant Measurements, Navigation: Journal of The Institute of Navigation, vol. 35, No. 4, 1988–89, pp. 483–501.
Appendix "O" of "Minimum Operational Performance Standards for GPS/Wide Area Augmentation System", 1996 RTCA, Inc., pp. 1–14.

* cited by examiner

Primary Examiner—Fan Tsang
Assistant Examiner—Keith Ferguson
(74) Attorney, Agent, or Firm—Pollock, Vande Sande & Amernick, R.L.L.P.

(57) ABSTRACT

A receiver of modulated carrier-wave signals equipped with a pseudo-random code time marker, particularly for radio navigation, comprises coincidence modules each of which comprises chronometric memory media which receives a wanted signal, provides storage as data of the time offset of the code offset estimates and the frequency and phase carrier-wave status, and on that basis provides, with a local clock, a local carrier-wave image and that least one local code repeat for the relevant signal and code and carrier-wave slaving control functions providing correlation of the wanted signal and the local code repeat on the basis of a frequency and phase offset signal between the carrier-wave of the wanted signal and the carrier-wave image. It further comprises Fourier transformation media for reception of the offset signal and management/decision-making media which provide invalidation of time offset data where the Fourier transformation indicates the presence of energy outside of the vicinity of a central coincidence line.

20 Claims, 9 Drawing Sheets

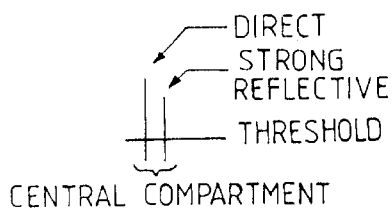
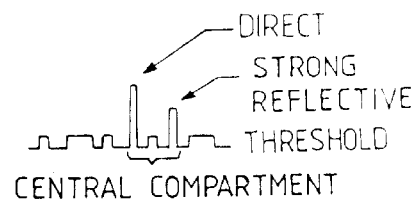
FIG.8A-1  FIG.8A-2
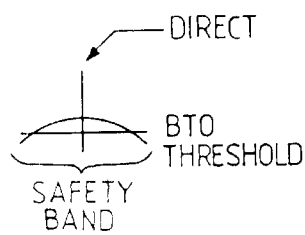
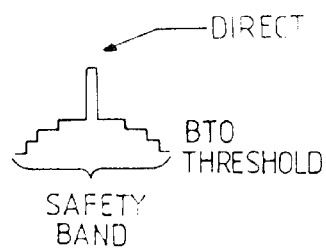
FIG.8B-1  FIG.8B-2
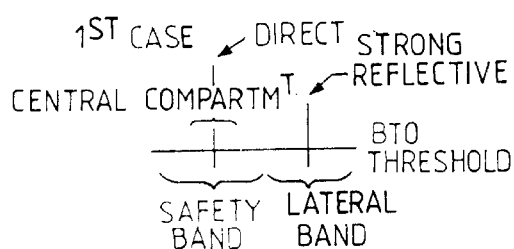
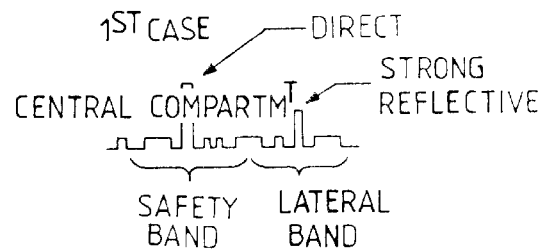
FIG.8C-1  FIG.8C-2
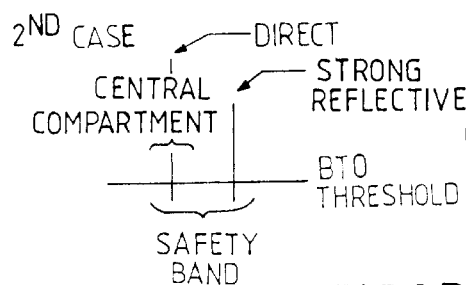
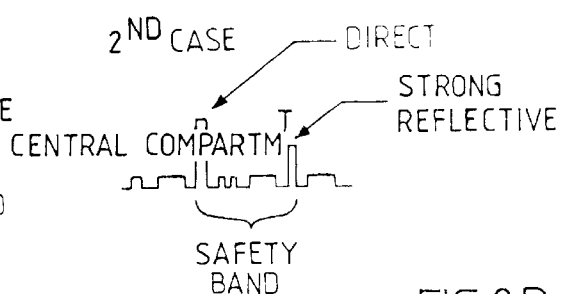
FIG.8D-1  FIG.8D-2

COMPLETE RADIO NAVIGATION RECEIVER, PARTICULARLY OF THE GPS TYPE

BACKGROUND OF THE INVENTION

The invention relates to radio navigation on the basis of the propagation time of an electromagnetic wave with a time marker between a transmitter and a receiver.

In recent navigation systems, the time marker of the carrier wave is of the repetitive pseudo-noise type; in practice, a random noise code is used. On reception, the propagation time of the wave is demonstrated both by a time off-set in the pseudo-random code and by a phase off-set in the carrier wave. In the context of relative movement on the transmitter/receiver line (line of sight), there is added a carrier frequency off-set due to the Doppler effect.

There are various sources of error: Some of them in connection with passage through the troposphere or ionosphere or variation in conductivity of ground surfaces—will affect the speed of propagation of waves in general; other error sources take account of the fact that the path followed by the radioelectrical wave as far as the receiver is not rectilinear, whilst others arise from the fact that the receiver experiences a combination of different paths originating from various reflections, which are generally due to surfaces adjacent to the reception antenna. These are termed multiple path errors: the direct path (the shortest) is overlaid with other, unwanted paths.

Within radio navigation systems, the most frequently employed systems at present, "GPS" and "GLONASS", their transmissions originate from satellites.

Currently, the main problem is how to combat the effects of multiple paths, as instanced by the article "Conquering multipath: The GPS accuracy battle", by Lawrence R WEILL, in the revue GPS World, April 1997, pages 59–66.

SUMMARY OF THE INVENTION

It is accordingly an object of the invention to combat the abovementioned effects of multiple paths.

The invention relates to a device for reception of radio-electrical signals or waves which bear a time marker based on repetitive pseudo noise, of the pseudo-random code type, with particular regard to radio navigation.

A device of this type comprises a high frequency reception system whose output (or "wanted signal") is distributed via several channels or modules, each of which is allocated to searching for coincidence (time phase) with a respective selected radioelectrical signal, distinguished by its code and/or its carrier frequency. To this there are added the means for analysis of time phase data provided by these coincidence search modules (more simply referred as coincidence modules).

Each coincidence module comprises firstly the means for formation of a chronometric memory, which is suitable for reception and/or storage of a code phase estimate and a frequency/phase carrier status estimate, and from deducing from such information by means of a local clock: a local carrier image and at least on e local repeat of the code for the relevant radioelectrical signal. It also comprises closed-loop control systems whose purpose is to produce co incidence between the code local repeat and the received code. These closed loop control systems comprise a code control loop operating by correlation between the wanted signal and the local code repeat and a carrier control loop which operates by means of a frequency/phase off-set signal between the carrier wave present in the wanted signal and the above-mentioned carrier wave image.

A coincidence module of this type can provide information with regard to the correct operation of its control loops. It is possible to take account of this partly for purposes of incoming radioelectrical signals which produce satisfactory results and secondly for purposes of analysis of time phase data.

According to one aspect of the invention, the receiving device further comprises media which are capable of bringing about Fourier transformation receiving a signal representative of the carrier frequency & phase off-set. On the basis of the Fourier transform, decision-making aids may at least partially invalidate the time phase data, particularly where the Fourier transformation indicates the presence of energy outside the vicinity of a central line, where such line corresponds to coincidence. Further on, we shall specify various characteristics, in greater detail, of the mode of operation of this frequency monitoring system.

In a preferred application of the coincidence module, media which constitute a chronometric memory comprise a carrier oscillator for purposes of defining the local carrier image, a code oscillator and a generator of at least one local repeat of the code. The code and carrier control loops, for their part comprise a discrete correlation channel comprising demodulation according to the above-mentioned carrier image and supplying a coincidence signal between the time position of the code in the wanted signal and its estimate, and at least one differential correlation channel comprising demodulation according to the above-mentioned carrier image and supplying an off-set signal between the code time position in the wanted signal and its estimate. The coincidence signal provides an off-set variable for a phase-lock carrier loop which provides pilot control of the local image generator for the carrier wave; and the code off-set signal provides the off-set variable for a delay-locking code loop, whose output is combined with that of the phase-locking carrier loop for purposes of pilot control of the code repeat generator.

A further aspect of the invention, which is very valuable in itself, is in "temporal"analysis. According to this analysis, we establish a further indication of the presence of multiple paths by recourse to the off-set signal originating from at least one differential correlation channel. For purposes of implementation of temporal analysis, present preference accrues to a system whereby each coincidence module comprises at least one second differential correlation channel whose spacing differs from that of the first. In such a context we resort to media to exploit the off-set signal originating from this second correlation channel, on its own and/or by its comparison (difference) in relation to the first off-set signal, as an indication of the presence of multiple paths.

Further on, we shall stipulate various, more detailed characteristics of the mode of operation of this temporal monitoring or analysis.

Other characteristics and advantages of the invention will transpire upon examination of the following detailed description, and the appended drawings.

BRIEF DESCRIPTION OF THE DRAWINGS

FIGS. 8A-1 to 8G-1 are frequency curves which illustrate various multiple-path (reflective and/or diffuse) situations;

FIGS. 8A-2 to 8G-2 are Fourier transform curves which are the respective equivalents of the curves in FIGS. 8A-1 to 8G-1;

DETAILED DESCRIPTION OF THE PREFERRED EMBODIMENT

Essentially, the attached drawings are definitive. Consequently they may not only provide greater ease of understanding of this description but can also contribute, as appropriate, to the definition of the invention.

Above all, radio navigation uses pseudo-random codes, although other types of time markers, similar to a noise, can be conceived of. A pseudo-random code is a repetitive chain of a pseudo-random sequence. It is also referred to as a pseudo-random noise code or the English abbreviation PRN (pseudo-random noise) may be used.

Figure 1:
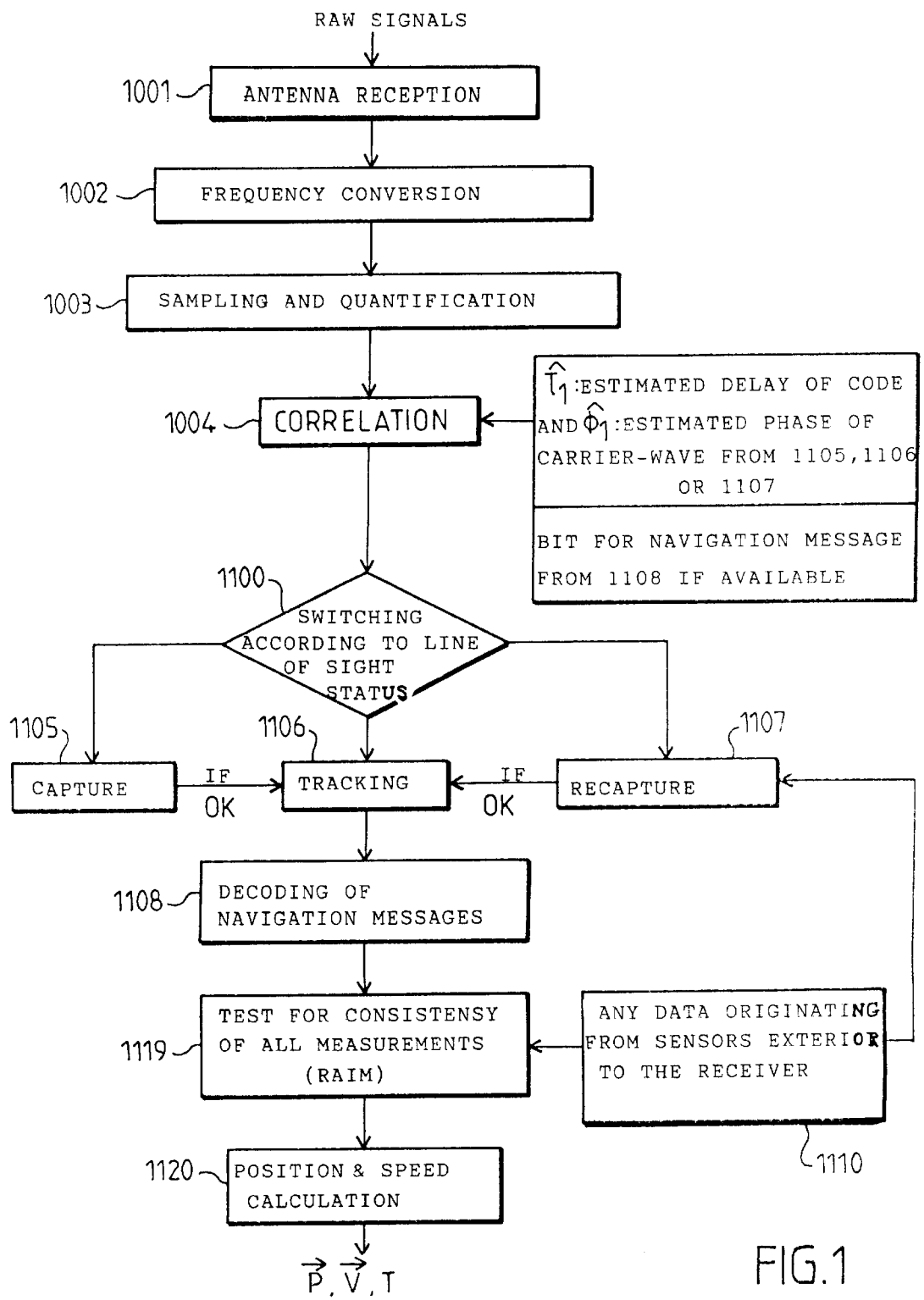
FIG. 1 is the general theoretical diagram of a GPS receiver.
Figure 2:
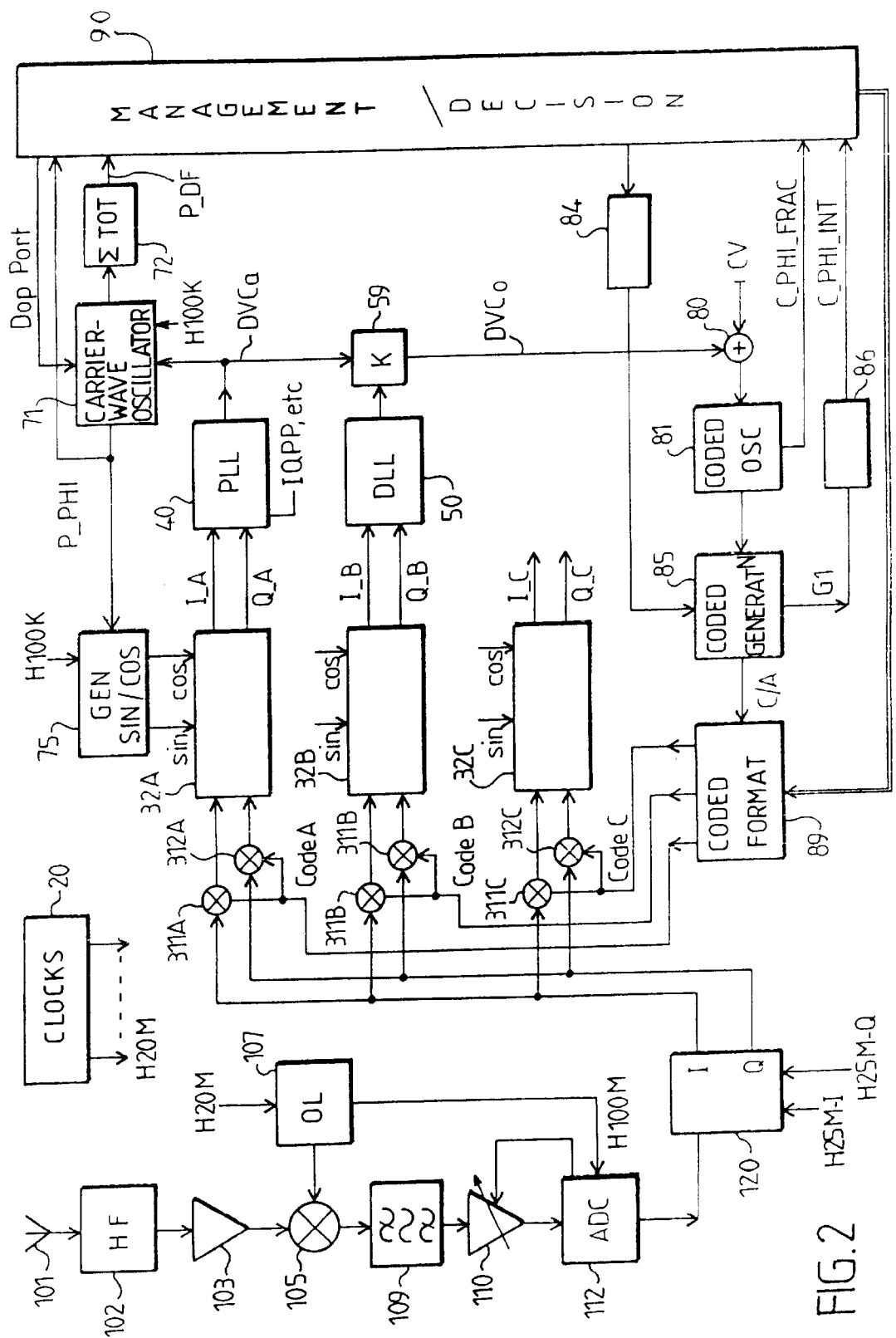
FIG. 2 is the more detailed diagram of a particular mode of application of GPS receiver to which the invention may be applied.
Figure 3:
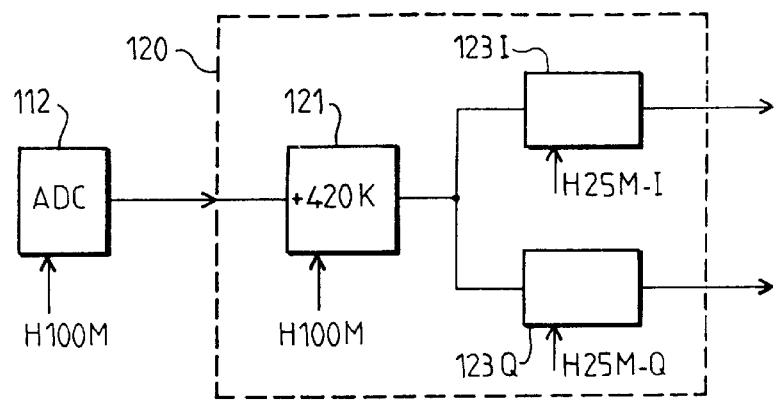
FIGS. 3 & 4 illustrate two details of the receiver from FIG. 2.

One means for generating a pseudo-random sequence is described in FR-A-2 248 517, with particular reference to FIGS. 1 to 3 therein. A pseudo-random sequence may be regarded as a sequence of bits, taking place over a well-defined clocking period. The expression of "code moment" or more frequently "chip" refers to a sequence bit and thus—by extension—to the duration (Dmc) of such a bit.

A pseudo-random sequence possesses the following property: its self-correlation function is zero except in the context of the zero time off-set, in which it adopts a triangular characteristic reaching its maximum in the event of synchronism. The triangle base width is ±Dmc (see FIG. 13A of FR-A-2 248 517 and the corresponding description). The zero value indicates a rejection level which is dependent on code length. From this it arises that it is possible to generate a variety of pseudo-random sequences of the same duration or "time"(Dprn), and whose intercorrelation functions are null.

In the GPS system, various satellites transmit carrier waves of a frequency of approximately 1 gigahertz, modulated by the respective pseudo-random codes and specific both to the satellite and to the carrier frequency. More specifically, the given satellite currently transmits 2 carrier waves equipped with respective PRN codes designated "C/A" (for "Coarse Acquisition" or "Clear Acquisition") and "P" (for "precise"). The first C/A code is public whilst the second code, designated P, exhibits a version denoted P(Y), which is intrinsically more precise than the C/A code but is subject to encryption which remains confidential. The polarisation of the carrier wave is right circular.

As GPS receivers today make predominant use of the non-scrambled "C/A" code, the result of this description is limited to that code and to the corresponding carrier wave, at 1575.42 MHz, which comprises 2 modulations:

A phase inversion rapid digital modulation (BPSK for Bi-Phase Shift Keying) according to a specific pseudo-random code of 1023 bits pulsed at 1.023 MHz where Dprn=1 ms and A far slower digital modulation (50 Hz) for definition of the satellite status data which is termed "navigation message".

It is clear that the invention is not limited to application of the C/A code on its own.

GPS satellites have a common time reference. The navigation message of a satellite ("ephemerides" and "almanachs") in particular comprises the drift in its own clock (in relation to a time reference) and the elements required for calculation of its position (orbital parameters). To sum up, since the parameters of their orbit are known, satellites can be considered as transmitting stations whose positions can be determined.

FIG. 1 provides an overview flowchart of a GPS receiver. Block 1001, on the basis of electromagnetic waves received from various GPS satellites (raw signals), provides reception as such, which converts the waves into electrical signals. There follows function module 1002 for frequency conversion followed by function module 1003, which corresponds to sampling and quantification.

Module 1004 corresponds to correlations and to other time measurements and de-modulations applied to the carrier wave. At this stage, correlation of the received code with the local repeat of the code generator corresponding to the satellite to be acquired (generated on the basis of a local clock) will make it possible to determine the arrival time of a received wave and to detect the slow modulation which it carries. In fact, if the two correlator input codes are in coincidence or almost so (within the above-mentioned triangular response), we obtain an output voltage; otherwise the correlator output is null, i.e. noise. Furthermore, it is by means of accumulating this voltage signal for a certain period that it is possible to obtain meaningful information with regard to coincidence (given the fact that the received signal is below the noise in the receiver's input band), and that it is possible to detect the navigation message. As the correlation operation is spread out over time in this way, all that such systems can do is to produce a weak transmission output corresponding to a reception level below noise level.

In practice, module 1004 comprises two control loops. A carrier wave control loop "tracks"the phase and carrier frequencies as received. One code control loop "tracks"synchronism between the receive code and the corresponding local repeat.

Thus the carrier wave loop stores memorisation of the total estimated phase $\Phi_i$ (upper case phi) of the carrier wave. In this context, the expression "total phase" comprises the phase off-set experienced by the carrier wave during the wave path time and the Doppler effect due to the relative motion between the satellite and the receiver. In fact it is more convenient to separate total phase into a frequency off-set $f_i$ and a phase $\phi_i$ (lower case phi) in accordance with the operation of a second-order carrier loop which firstly performs frequency capture and then phase capture. Frequency off-set $f_i$ corresponds to a Doppler off-set and hence a relative speed; and this is why it is called "speed".

The code loop provides memory storage of an estimated delay of code Tau (circumflex)$_i$, in relation to the local clock. The ambiguity, corresponding to a code length (Dprn=1 ms, i.e. approximately 300 km), is relieved by means of the navigation message and possibly by a position estimate available from elsewhere.

As is known, the receiver can then take various statuses, which corresponds to the functional test unit 1100 which is referred to as "switching according to line of sight status". In an entire initialisation phase, we initially perform capture or acquisition in 1105. Once this is done it is possible to transfer to tracking phase 1106. On the other hand, if capture has already been established and if we have already transferred to the tracking phase but synchronism has been lost, then it is possible to re-capture as indicated in 1107. This recapture may take account of data originating from sensors external to the GPS receiver as indicated in 1110.

When we are in tracking phase 1106, it is possible to perform decoding of navigation messages (module 1108). In 1119, there is a test for consistency of all measurements which can also take account of data originating from sensors external to the receiver (1110). This consistency test can advantageously make use of "RAIM" (Receiver Autonomous Integrity Monitoring) techniques. These techniques, when applied in the case of redundant measurements are used to determine the lines of sight which may entail a positioning error and to separate them from processing of position determination. In particular, these are described in the Journal of the Institute of Navigation:

vol.35 No. 4, Winter 88–89, article "Navigation System Integrity Monitoring Using Redundant Measurements" by Mark A. STURZA, vol 35 No. 2, Winter 1988, article "Autonomous GPS Integrity Monitoring Using the Pseudo-range Residual" by BRADFORD W. PARKINSON and Penina AXELRAD, and vol 39 No. 3, autumn 92, article "A Baseline GPS RAIM Scheme and a Note on the Equivalence of Three RAIM Methods" by R GROVER BROWN.

There will also be found a description of it in Appendix "O" of "Minimum Operational Performance of Standards for GPS/Wide Area Augmentation System Airborne Equipment", RTCA, Doc. No. RTCA/DO-229, Jan. 16, 1996, prepared by SC-159, whose Appendix "E" provides references to other articles.

With effect from the reception times for waves obtained in 1001, module 1120 applies triangulation type technology which makes it possible to determine the position and the speed of the GPS receiver. Thus we obtain a position vector P and a speed vector V. The position co-ordinates are defined in relation to a reference ellipsoid referred to as WGS 84 (World Geodetic System) which differs from the geoid.

Several path time measurements (at least 4) are needed in order to determine the position of the receiver. In principle, redundancy is applied in order to increase precision and to provide greater ease of handling of the consequences of loss of contact with one of the satellites. In order to determine the position of the receiver, module 1120 must also calculate an estimate of the "clock bias" i.e. the time off-set between the clock of the receiver and "GPS time", i.e. the general (reference) time of the system common to all satellites.

We already have certain means for endeavouring to overcome the interference signals which are set up by multiple paths.

A first category of such means relates to airborne signals. Satisfactory rejection of inverse-polarisation interference signals can be obtained by hellicoidal type antennae which attenuate the power of multiple paths which have experienced an odd number of reflections. Earth planes or absorbent planes may be arranged below antennae in order to attenuate the effect of reflections coming from the ground or even in a glancing-incidence situation. We also have knowledge of annular structure antenna more specifically referred to as "choke ring", which comprise honeycomb systems which constitute traps. Again, recourse may be had to bundle-formation antenna with a directional alignment curve in order to eliminate unwanted multiple paths or at least to attenuate them. There are further known multi-antennae systems which are based on the spatial de-correlation of multiple paths, for purposes of their elimination.

These various solutions can be implemented in the devices described here but do not in themselves constitute the centre of this invention.

It is also endeavoured to reduce the effect of multiple paths at the stage of design of receivers themselves.

The "harmonic" process exploits the code/phase divergence observed on a line of sight (the line of sight is the line which joins the line of the shortest effective path between a satellite and the receiver). This technology, which is implemented by the Applicant, is based on the fact that the error observed on the carrier wave is less than that which is observed on the code. By performing code smoothing by means of phase, it is possible to observe the code/phase off-set and to deduce on that basis the presence of multiple paths. In fact, an increase in the mean value of the code/phase off-set observed on a line of sight is symptomatic of the presence of multiple paths, which may also, furthermore, be utilised in the context of implementation of this invention.

Document F-A-2 698 966 describes another technology which consists of using the front flank of the correlation peak, it being commented that the (physical) multiple paths always lag behind the direct path and that the front flank is not greatly deformed, or not at all. Thus we obtain an improvement in the behaviour of the receiver.

It has also been proposed to exploit the correlation curve by analysis of the variation of its slope and by utilisation of multiple correlators based on this curve's deformation in relation to its canonical form. This technology, which is particularly described in U.S. Pat. No. 5,390,207, provides interesting results where a limited number of multiple paths exist in an adequately stable state.

Furthermore, it has also been proposed to reduce the differential correlation spacing in a DLL loop which operates in tracking phase as indicated for example in the file of Patent EP-A-0 488 739.

The processes described above are intended for detection of multiple paths and, for some of them, to achieve partial mastery of them.

The Applicant has observed that if these known processes are suitable for certain, well-annotated categories of multiple paths, on the other hand they are not for general application and may even, in certain cases, incur the risk of having the opposite effect to that intended in the presence of multiple paths which do not belong to successfully-handled categories. Furthermore, by multiplying correlators (which also have to be multiplied by the number of satellites dealt with), the receiver is made considerably complicated.

Consequently, following in-depth study of the corresponding phenomenon, the Applicant preferred to focus on receiver layouts which would enable detection of multiple paths in the interests of preventing the receiver from utilising incorrect measurements for localisation (or indeed using these incorrect measurements for other purposes). The redundancy of available measurements and the low probability of observation of multiple paths simultaneously on several lines of sight thus make it possible for a minimum hardware investment to gain a significant increase in positioning quality.

Although the invention may be applied to various GPS receiver structures, it harmonises particularly well with a receiver having three correlation channels which will now be described. FIG. 2 is a more detailed diagram of such a receiver limited to one satellite channel for purposes of simplification.

The receiver starts with an antenna 101 and a high frequency stage 102 (module 1001 from FIG. 1). This is followed by an amplifier 103, the assembly operating on a bandwidth which—here—is 20 MHz at a frequency of 1575.42 MHz in the selected example. The high frequency bandwidth is between approximately 2 MHz and some tens of MHz.

A mixer 105 receives the output from amplifier 103 and a local signal of 1400 MHz from a local oscillator 107; at its output, it produces an analogue wanted signal of 175.42 MHz frequency. This signal is applied to a band-pass filter 109 centred on 175.42 MHz with a response of ±10 MHz at −3 dB, and ±25 MHz at −15 dB. Module 1002 from FIG. 1 corresponds to these components 104 to 109, to which amplifier 103 may be added.

Filter 109 is followed by an amplifier 110 and then by an analogue/digital converter 112 whose output is the wanted signal, in this instance in digital form. Amplifier 110 should preferably be of the variable-gain type, where its gain is controlled on the basis of the level of the signal for conversion, such as to optimise the number of significant figures at the output of the converter (2 bits).

A generator of clock signals 20 produces various clock signals which are wanted for the receiver and which are, unless otherwise mentioned, all interconnected. Thus, this generator 20 generates, for example, a frequency of 20 MHz which fulfils the function of pilot control (by multiplication) of local oscillator 107. The latter comprises a voltage controlled oscillator (VCO) operating at 20 MHz and equipped with a phase lock loop (PLL) on this pilot frequency of 20 MHz. From the oscillator output, frequency generators produce the 100 MHz frequency which provides clocking for sampling within the analogue/digital converter 112 and other wanted frequencies of 14009 MHz and 25 MHz, for the main part.

The analogue signal has a frequency of 175.42 MHz. It is sub-sampled at 100 MHz, which is the equivalent of frequency transposition to 200 MHz. Thus it is possible to regard the output of analogue/digital converter 112 as a digital signal centred on 24.58 MHz. This digital signal, expressed over 2 bits, here comprising 4 samples per period, is applied to a complex sampler 120, described in detail in FIG. 3.

At the head, the sampler comprises, in 121, a single lateral band frequency converter of 420 kHz, setting the operating frequency to precisely 25 MHz (24.58+0.42). The signal coming from this block 121, which is clocked at the output by frequency H100M (the same clock frequency as for converter 112), is applied to 2 operators 123I and 123Q, clocked respectively by clocks H25M-I and H25M-Q at 25 MHz, each being in quadrature with the other. These operators 123 are managed such as to produce digital base band signals and expressed over 4 bits, i.e. respectively: a phase signal (output I) and a signal in quadrature (output Q). By analogy with complex numbers, we also refer to real component 1 and imaginary component Q.

Module 1003 in FIG. 1 comprises the system which includes analogue/digital converter 112, preceded by its variable-gain amplifier 110 and also including digital sampler 120.

The two outputs I and Q of complex digital sampler 120 are distributed over 3 channels (module 1004 in FIG. 1). These three channels are distinguished by letters A, B and C, for correspondence of the identically termed correlations A, B and C to which there are associated three possible offsets of the pseudo-random code which determines the satellite to be tracked. Further on, we shall see that channel B is "differential", i.e. that it operates on the basis of the difference between two repeats of the same pseudo-random code, with time spacing between one and the other around the off-set associated with this channel B. Channel C can be normal (code C1) or, again: differential (code C2).

Figure 4:
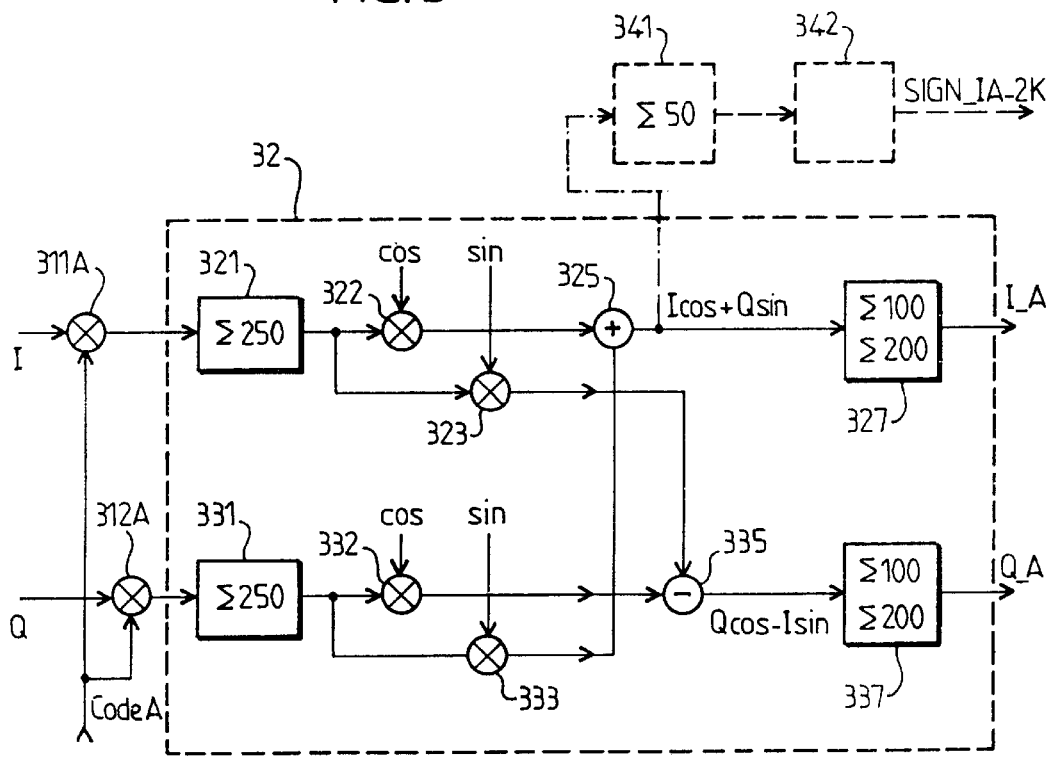

For purposes of example, FIG. 4 provides the details of channel A which appears at the top of FIG. 2. Signals in phase 1 and in quadrature Q are applied respectively to two digital correlators 311 A and 312A which also receive code A and whose outputs jointly pass to a carrier wave demodulator 32A.

For signal I (real components), the output of correlator 311A (4 bits) is applied firstly to a summing stage 321, which provides cumulative calculation over 250 digital samples (9 bits). This cumulative calculation is applied to 2 digital multipliers 322 and 323, also receiving respectively the COSine and SINe information for the carrier wave phase (P_PHI), each expressed over 6 bits. The respective results, referred to as $I_{cos}$ and $I_{sin}$ are expressed over 9 bits. This system is the same for signal Q (imaginary section) with correlator 312A (4 bits) summing stage 331 and the two digital multipliers 332 and 333 whose respective results, noted $Q_{cos}$ and $Q_{sis}$ are expressed over 9 bits.

Next, the main outputs of channel A, in phase and in quadrature, comprise a signal I_A, provided by a digital incremental stage 325 which sets up $I_{cos}+Q_{sin}$, over 10 bits, which a summing stage 327 accumulates over 16 bits and a signal Q_A, supplied by a digital subtractor stage 335 which sets up $Q_{cos}-I_{sin}$, over 10 bits which a summing stage 337 accumulates over 16 bits.

Accumulations in 327 and 337 are performed over 100 or 200 samples in a switchable manner which corresponds to an integration time of 1 or 2 milliseconds (time base at 1 kHz or 500 Hz). And, starting from approximately 25 MHz, cumulative calculations have been performed over 250×100 or 200 digital samples.

The two other channels in FIG. 2 are of a structure identical to that described above, and bear the same digital references, but with suffixes B and C respectively, where the correlators receive code B and code C.

Furthermore, for channel A on its own (hatched line on FIG. 4), the output of incremental stage 325 is applied to a summing stage 341, operating over 50 samples. The sign bit at the output of summing stage 341, which is available every 0.5 ms, is memorised and serialised in memory 342 in order to supply 2 or 4 successive sign information items depending on whether we are operating at 1 kHz (1 ms) or 500 Hz (2ms). This sign information, referred to as SIGN_IA_2K, corresponds to slow carrier modulation of status data, "ephemeride" and "almanach", which go to make up the navigation message.

The signal couples I_A and Q_A, I_B and Q_B, I_C and Q_C (or their modules or the square of the same), and signal SIGN_IA_2K all go to the management/decision-making unit 90 (the connections are not illustrated in the interests of avoiding cluttering up the drawing in FIG. 2). Furthermore:

Signals I_A and Q_A pass to a carrier wave loop stage 40 which is preferably of the PLL (phase lock loop) type and whose output DVCa (carrier wave speed off-set) over 16 bits, will pass, in the signal tracking phase, firstly to a carrier wave oscillator 71, with digital control, and secondly to a stage 59 which defines a code speed off-set DVCo which will be described further on; outputs I_B and Q_B of carrier wave demodulator 32B or channel B culminate in a code loop stage 50, preferably of the DLL ("delay lock loop") type.

The carrier wave oscillator 71 operates on clock speed H100K (100 kHz). Its output P_PHI, which represents the carrier wave phase, on 7 bits, sends supply to a sine/cosine generator 75, also pulsed at clock speed H100K, and supplies, on 6 bits, the respective COSine and SINe signals of the carrier wave phase which pass to the carrier wave demodulators 32 already mentioned above.

From the signal DVCa, carrier wave oscillator 71 adjusts its phase P_PHI, but also, whenever it changes according to modulo 2Π, by providing an incremental or decremental information item of 1 phase rotation to a circuit 72 which then, over 16 bits, accumulates the number of rotations P_DF produced by the carrier wave, i.e. the total component of its total phase. The fractional component of the total phase, over 16 bits, is the above-mentioned carrier wave phase P_PHI. The group comprised of P_DF and P_PHI will pass to the management/decision-making unit 90.

Code oscillator 81, which is also a digital-control oscillator, is pulsed by a clock at frequency H25M (25 MHz). Its output, over 1 bit, supplies a code generator 85. It also supplies a chip fraction information item C_PHI (or "code phase") over 16 bits which is returned to management/decision-making unit 90 (analysis).

The digital control of code oscillator 81 is defined over 32 bits by the output of an incremental stage 80, of which one input receives a CV signal at a frequency of 1.023 MHz which is the base speed of the pseudo-random code. The other input of this incremental unit 80 receives a correction (speed assistance) coming from unit 59 mentioned above. This correction DVCo corresponds to the output of code loop DLL 50 "aided" by the output of carrier wave loop PLL 40. Unit 59 makes it possible to convert correction DVCa in the same unit of time as that of correction DVCo. The conversion ratio K of unit 59 corresponds to the ratio of the respective code and carrier wave frequencies, i.e. 1540 (1575.45 divided by 1.023).

The code generator 85, for its part, receives a time phase information item originating from a table 84, which is made up under the control of management/decision-making unit 90 on the basis of the number of the PRN code referring to the relevant satellite.

It provides a base code C/A referring to the relevant transmitter (carrier wave frequency) over an output passing to the code 89 format unit. Fractional component C_PHI_FRAC for the "code phase" information item is read at the output of the code oscillator as described above. Furthermore, code generator 85 supplies an information item referred to as "register G1" which is representative of its own phase and which culminates in unit 86. This converts the information for register G1 into a chip number or order (1 of 1023), which represents the entire component C_PHI_INT of the information item called "code phase" C_PHI.

On the basis of the base code C/A generated by circuit 85, the repeats A, B and C of this code will be produced corresponding to the above-described three correlation channels. These repeats make it possible to achieve pilot control of the corresponding correlators 311A to 311C; one of them, channel A is called "discrete"; the two others, B and C, are called E-L ("Early minus Late"), with different spacings.

Figure 5:
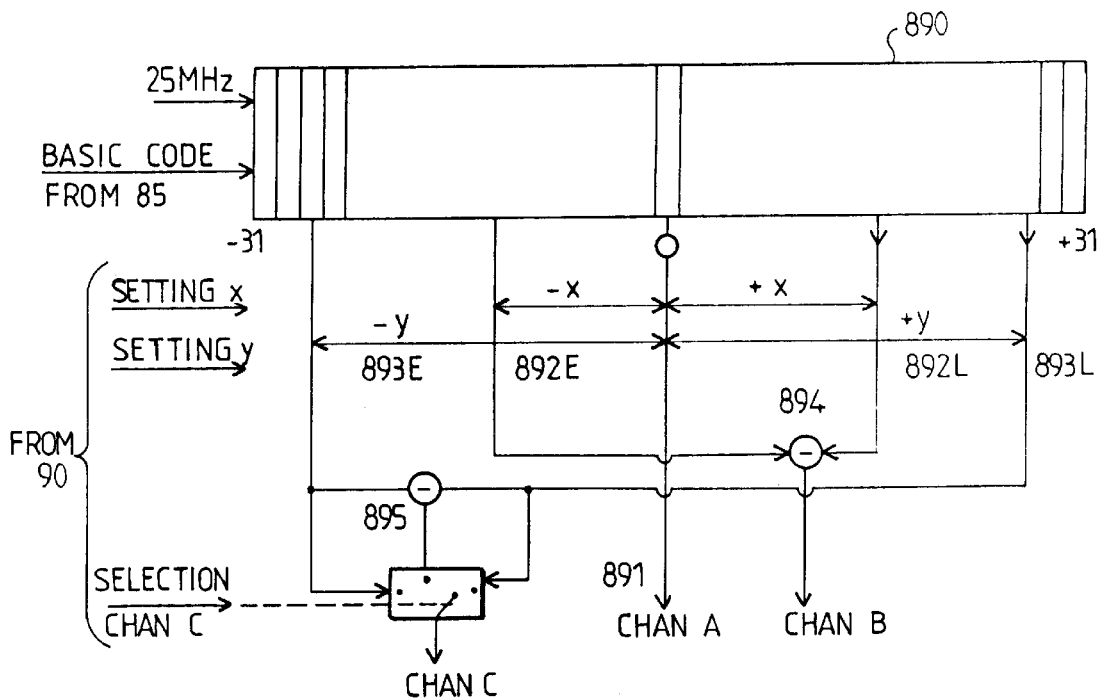
FIG. 5 is an equivalent diagram providing greater ease of understanding of the generation of local repeats applied to correlators in the receiver from FIGS. 2 to 4.

This generation of repeats is produced in code formatting unit 89. The mode of operation of this formatting corresponds to that of a delay line whose diagram is set out in FIG. 5.

An off-set register 890 with 63 compartments (−31. 0, +31), is supplied by the code coming from code generator 85, sampled at 25 MHz. Each compartment of register 890 thus represents a period of this clock at 25 MHz, i.e. 40 ns (nanoseconds), or again ¹⁄₂₅ chip. The output of the 5 compartments from among the possible 63 will enable generation of repeats A, B and C.

A pre-programmed output 891 coming from central compartment 0 will represent the input of centred discrete channel or channel A coded to 1 bit.

The other outputs 892 E and 892 L, and 893 E and 893 L can be programmed in two's symmetrically in relation to compartment 0. They are combined in logic operators 894 and 895 which perform logic subtraction and division by 2, and respectively supply the inputs for the correlators of channels B and C, coded over 2 bits.

Thus, the local repeat of channel B corresponds to a position of outputs 892 E and 892 L to ±x fractions of ¹⁄₂₅ chip, hence a discrepancy or spacing of 2.x/25 chip (between the two codes E for Early and L for Late between which we have differentiated).

For its part, the local repeat of channel C corresponds to a position of outputs 893 E and 893 L to ±y fractions of ¹⁄₂₅ chip, hence a discrepancy or spacing of 2.y/25 chip.

Values x and y can be programmed by inputs x and y from module 89 of FIG. 2 originating from management/decision-making unit 90 with:

x variable from 1 to 15, coded over 4 bits and y variable from 1 to 32, coded over 5 bits and y greater than x.

Channel C can be formed either by the output "C2" of 895 (of form 893 E minus 893 L) or by the output of 893 E or—again—that of 893 L (all of these outputs being referred to as C1).

It will be noted that codes A, B and C2 are defined jointly, and have the same centre.

Figure 9A:
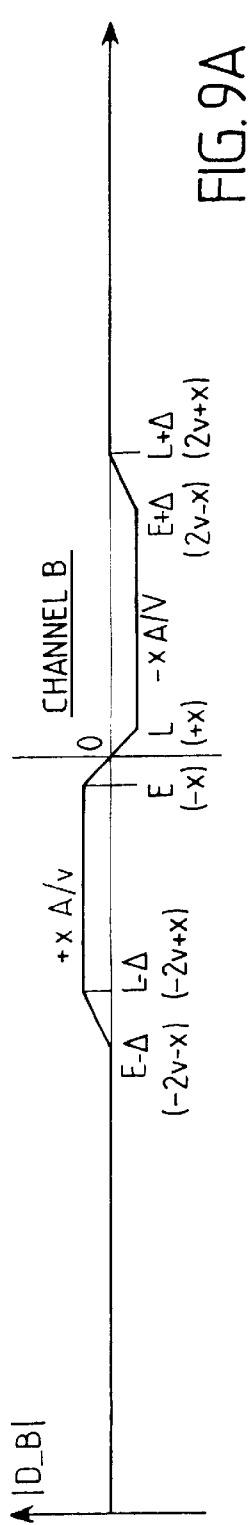
FIGS. 9A to 9C are three time curves which illustrate respectively the outputs of the two differential correlation channels B and C of the receiver from FIGS. 2 to 4, with different spacings, and the differential signal between these two outputs.
Figure 9B:
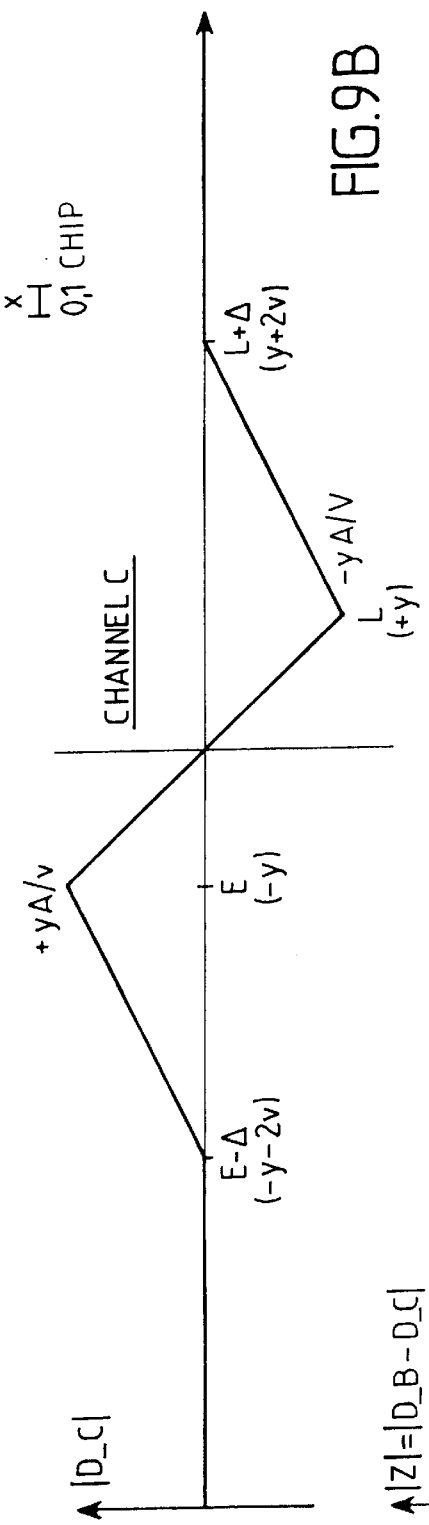

As mentioned above, where we correlate the received signal with a local repeat of anticipated code PRN (channel A), the response from the correlator is of a triangular characteristic with a maximum of synchronism and the width of the triangle base is ±Dmc or±1 chip.

Where the received signal is correlated with the difference between two local repeats, which are spaced out, for the anticipated code PRN ("differential" repeats B or C2), the result of correlation (which is also "differential") corresponds to what would be the difference between two correlations performed respectively with the two components of the differential repeat; for example, the output of the channel B correlator with the local repeat (892E-892L) corresponds to the difference between the outputs of 2 correlations performed respectively with the local repeats available in 892 E and 892 L. The time off-set between 892 E and 892 L (for example) is called the spacing, or deviation window, or again the deviation measurement. The two correlations which are thus the subject of differentiation each have a triangle response of width ±one chip at the base. Inasmuch as the spacing is less than two chips, they will be made up. Thus, FIG. 9A illustrates the response for channel B with a spacing 2x=0.2 chips (this value of x is taken for purposes of example), whilst FIG. 9B illustrates the response from channel C with a spacing 2y=1 chip. On these figures, Δ symbolises the duration of one chip, called Dmc (=2.v) in the description, whilst coefficient A is a variable connected with the amplitude of the received signal. In both cases, the centre of this composition provides a markedly linear response zone which passes through zero to the central point of the differential correlation window. It is this zone which enables pilot control of a time control loop, as provided by channel B. Normally (FIG. 9A), two stages can be observed on either side of this central zone, of duration d+Dmc, where d is the deviation measurement spacing; its duration is therefore 2(v−x) on FIG. 9A. On FIG. 9B, this stage is reduced to a point because 2(v−y)=0 since v=y.

Upon initialisation of the receiver, a known "acquisition" or "capture" phase makes it possible to set the discrete code of channel A adequately close to synchronism with the received signal to obtain a response (a peak) in correlators 311A and 312A, and consequently signals I_A and Q_A which are above the noise level. This can be done by systematic search and/or by taking account of information which is already available, from an external source or, again, due to the fact of previous operation of the GPS receiver (recapture). It is possible to decrease the systematic search time by parallel utilisation of code A together with one and or the other of versions 893 E and 893 L of code C (it may be appropriate to set channel B such as to enable it to perform, at this stage, the same function as channel C). This systematic search can be performed by any means known to professionals in this field.

Next, we enter a tracking phase with codes A, B and C2. A signal D_B, which will be mentioned again further on in relation to FIG. 6 (output of deviation measurement stage 50 with phase lock loop PLL), provides pilot control of the code loop until a time phase to $\pm \frac{1}{10}^{th}$ of a chip is obtained, or—even better—via channel B. The approximate positioning of the code loop (accurate to ±1 chip) can be found by means of deviation signal D_C, which will also be mentioned again further on in relation to FIG. 6 (output of deviation measurement stage 60).

In a continuous regime, tracking control is performed by means of codes A and B. Under the effect of the code control loop function for channel B, the response from channel A (output of accumulators 321A and 331A) is at a much higher level than the synchronism between the received code and code A, or discrete code, is more precise. Next, multipliers 322A and 323A on the one hand and 332A, 333A on the other provide demodulation via the carrier wave phase. Recombinations brought about by components 325 and 335 provide a phase off-set in its exact components, given the separation into two complex channels I and Q. After accumulation in 327A and 337A, signals I_A and Q_A are fed to the PLL stage of carrier wave loop 40, which is typically a second-order loop with a pass band of 30 Hz. Its output represents the carrier wave phase off-set and provides digital control for adjustment of oscillator 71, whose base frequency is H100K (100 kHz). This oscillator 71 sets up a total phase memory for the carrier wave with:

an output P_PHI, applied to cosine & sine generator 75 (over 7 bits) and to management/decision-making unit 90 (on 16 bits, to preserve the accuracy of the Doppler shift), and a number-of-rotations output P_DF applied to management/decision-making unit 90. This number of rotations represents a frequency variation.

These two values P_DF and P_PHI in relation to the frequency of 100 kHz together define a fine measurement of the time off-set on channel A by use of the carrier wave frequency in the vicinity of synchronism on the received code. This fine measurement is called the carrier wave pseudo-range (or carrier "pseudo range"). In the capture (acquisition) phase in open loop, the carrier wave oscillator set point is supplied by management/decision-making unit 90 on the basis of an estimated Doppler ("Dop. Port").

In closed-loop tracking phase, the value of the corresponding deviation at the output of PLL stage 40 is applied to the carrier wave oscillator and to register 59 and digital incremental unit 80 for purposes of "aiding with speed" for the code loop which is slaved to the components in phase I_B and in quadrature Q_B for channel B. For example, the code loop is a second-order loop with a 1 Hz pass band, aided for speed by an output of the carrier wave tracking loop.

To sum up, in a stabilised tracking status (in the absence of multiple paths):

the carrier wave loop is captured for frequency and phase and the code loop is also captured with a deviation signal which is theoretically close to zero at the output of channel B.

In the above descriptions, the estimated phase of carrier wave $PHI_i$ is a total phase, i.e. it may comprise a frequency off-set of a certain number of rotations, as has been seen. For that reason it is simpler to break it down into a frequency $f_i$ and a phase as such, i.e. modulo $2\pi$, referred to as $\phi_i$.

These estimated delay parameters for transmission of code between the satellite and the receiver and for Doppler frequency (with phase) as estimated, which is applied to influence the carrier wave for the signal, are intended to enable pilot control of correlations in order:

To detect the presence of a signal, which is done by channel A, in order to validate the approximate estimates of tau (circumflex) and f (circumflex) which are utilised in the search phase, Again with the aid of channel A, to control the carrier wave tracking loop, which is initially captured for frequency and then for phase once the frequency deviation between the actual Doppler shift and f (circumflex) becomes adequately low, Simultaneous with capture of the carrier wave tracking loop, the code tracking loop of channel B is engaged; this loop makes it possible to refine the estimate tau (circumflex) of the satellite/receiver distance. Finally, this finer estimate tau (circumflex) will in turn be smoothed by phase analysis performed by means of the carrier wave loop. Smoothing in this context means, for example, the fact that phase values off-set by mean range values are employed.

The carrier wave tracking loop produces various operating signals in relation to its status, which are transmitted to the management/decision-making unit 90 in particular:

A logic signal IPPP (standing in French for pour Indice de Poursuite Porteuse en Phase, English, Phase Carrier Wave Tracking Index) indicating that the carrier wave loop has changed from the frequency tracking mode to the phase tracking mode (provided that it remains consistently in phase tracking), A logic signal IRBP (standing for French: Indice de Rejection par la Boucle de Porteuse, or English Carrier Wave Loop Rejection Index) indicating that the rejection performed by the carrier wave loop is correct. Ideally, this index will be based on analysis according to predetermined criteria of the levels in the various compartments available at the output of FFT, at the level of the discriminator of the carrier wave tracking loop. The simplest criterion, but not as an exhaustive statement, is that energy should essentially be situated in the central compartment (or generally the main compartment) and not in the compartments adjacent to it;

A logic signal IQPP (standing for French: Indice de Qualite de Phase Porteuse, English: Carrier Wave Phase Quality Index). This index is typically based on the fact that the phase comparator noise for loop 40 is or is not acceptable, As appropriate, a logic signal IQPC (standing for French: Indice de Qualite de Poursuite Code, English Code Tracking Quality Index) indicating that the code loop is not in balance (a situation which is theoretically impossible when channel B is supplying the distance tracking information, on the code, via the scalar product and standardisation obtained on the basis of channel A, as is the case here), Possibly, too, a logic signal ITPP (standing for French: Indice de Trainee en Poursuite Porteuse, English: Carrier Wave Tracking Lag Index) indicating that the carrier wave loop is struggling to track a high frequency variation in the incoming signal, theoretically due to high variation in the component of acceleration along the line of sight.

Known GPS receivers already comprise decision-making media for elimination of a line of sight which provides a dubious measurement. The decision to invalidate a line of sight is typically based on the fact that the carrier wave loop does not consistently remain in phase tracking mode (logic signal IPPP) or—again—that the code loop is not in balance (signal IQPC). Such provisions exist in many GPS receivers, for invalidation of lines of sight and/or for indication to the operator that a line of sight is dubious. The choice of signals employed as the corresponding basis is largely dependent on the design of the carrier wave and code tracking loops. If the line of sight is invalidated, then the receiver will not validate the corresponding estimates and will operate only with the estimates which are available for the other line of sight. It may attempt a fresh capture or recapture phase with the same satellite or may prefer to seek another, more promising satellite.

It thus appears that the receiver is sensitive:
a) To the mean level of energy in the signal and the amplitude fluctuation ratio for detection,
b) To the spectrum distribution of the energy for carrier wave tracking,
c) To the time distribution of the energy for code tracking.

The Applicant has observed that the presence of multiple unwanted paths exerts an influence on these three characteristics and may distort the measurements generated by the receiver for a given satellite. It is known that, for interference-free signals and for an absolute GPS, positioning error may decrease to 175 m (three dimensional). This error decreases from 1 to 10 metres in differential GPS; in differential interferometry (geodetics, attitude determination), the error is reduced to a few cm, still in three-dimensional mode. In these applications, where the desired precision level is markedly better, where we are typically utilising a code or phase differential GPS system or—again, one using short-base interferometry, the multiple-path phenomenon even becomes a major obstacle which compromises the anticipated precision of the GPS receiver.

The Applicant has also commented that the probability of simultaneous appearance of multiple paths on various channels is low. Furthermore, due to the fact that we are generally operating on a redundancy basis for available measurements, with several satellites, it is generally possible to continue calculation for navigation solutions by eliminating one or even two dubious measurements.

In this perspective, the Applicant sought technologies making it possible to identify or detect dubious measurements because of multiple paths without the prior intention of deducing corrections for these dubious measurements as the result.

The technologies proposed here entail double analysis, i.e. frequency analysis performed at the carrier wave loop and time analysis performed in conjunction with the code loop and by means of an additional correlation channel.

In brief, as we shall see, the primary goal of frequency analysis is to detect multiple paths whose Doppler component is distinguished from that of the direct path whilst time analysis supplements the above by processing the detection of multiple paths whose Doppler shift in relation to the direct path is low or very low.

We shall start by describing frequency analysis. This technology provides a particularly valuable synergy with time analysis but also has value of its own irrespective of such time analysis.

Figure 6:
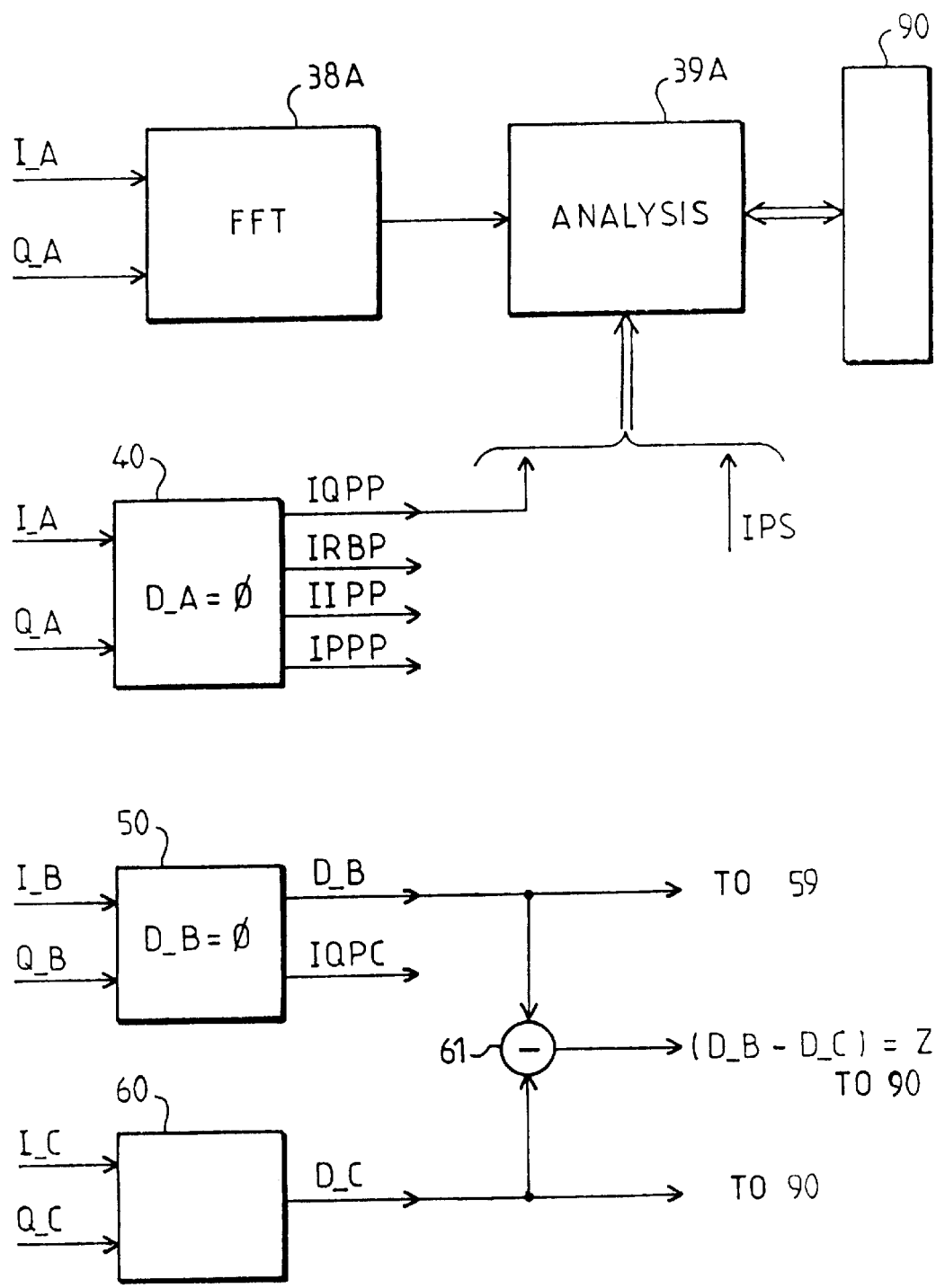
FIG. 6 is a partial view illustrating one of the characteristics of this invention.

In FIG. 6, module 38A designates a rapid Fourier transformation circuit of FFT with I_A and Q_A as its input signals.

This rapid Fourier transformation is performed over 512 points in one millisecond, typically. Analysis circuit 309A, which receives the output of the Fourier transformation will perform various operations which are described further on, in conjunction with the management/decision-making unit 90 (in practice, circuit 39A is incorporated in unit 90).

Figure 7:
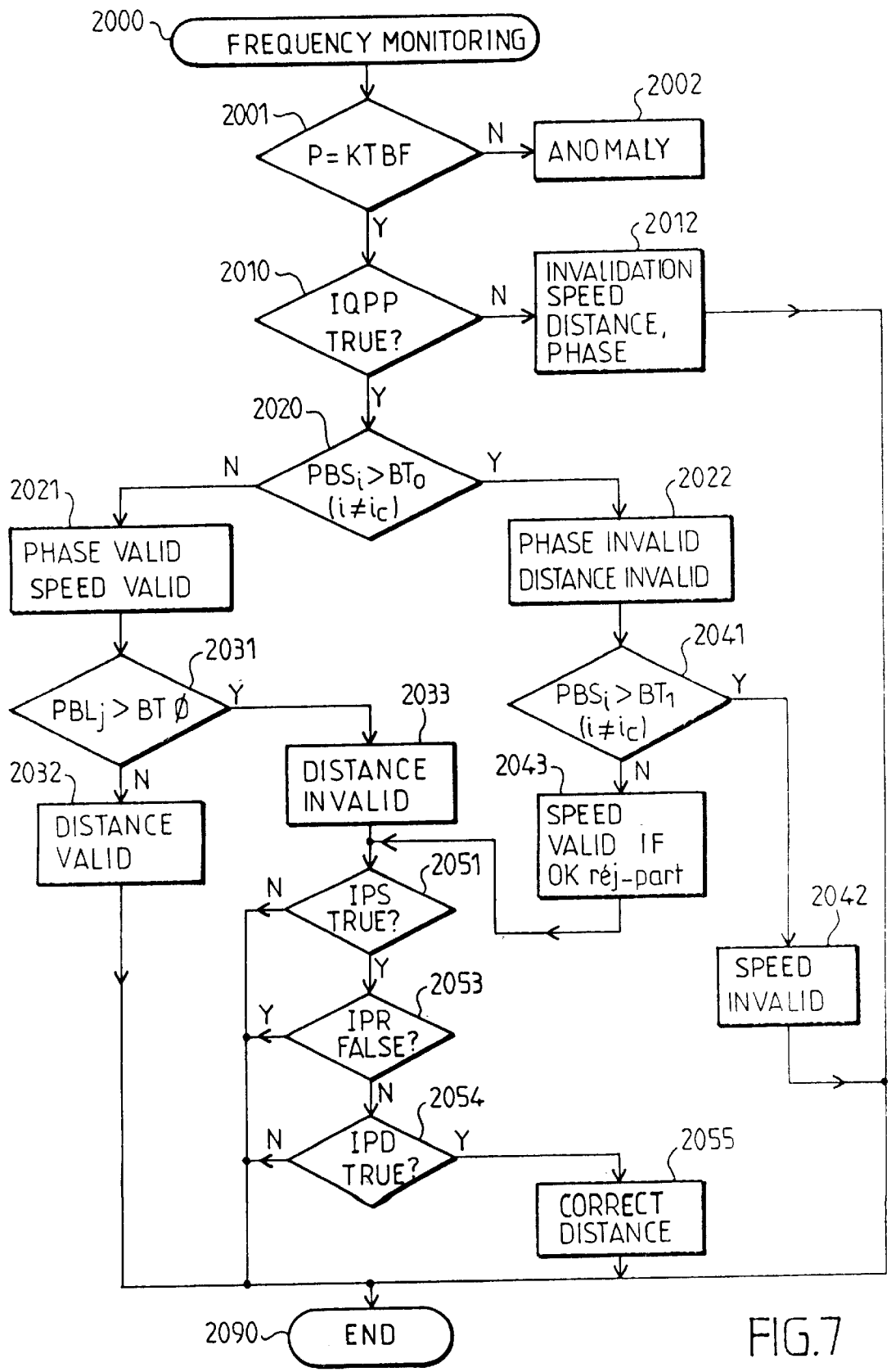
FIG. 7 illustrates the mechanism associated with frequency monitoring as per the invention.

The mode of operation of analysis circuit 39A corresponds to the frequence monitoring mechanism illustrated in FIG. 7. After input module 2000, frequency monitoring comprises an initial test 2001 which consists of examining whether the level of signal P at the input is normal, i.e. equal to thermal noise KTBF, accurate to the prescribed tolerance. If this condition is not fulfilled, then there is a general anomaly, a serious malfunction likely to have repercussions on various parts of the receiver and thus one which cannot theoretically be diagnosed in terms of multiple paths.

The remainder of the mechanism entails logic signals such as IQPP, which originate in particular from carrier wave tracking loop 40.

If index IQPP is incorrect (status 2010), which typically indicates that the noise of the phase comparator is excessive, then stage 2012 will invalid speed, distance and phase for the relevant channel.

Figures 1, 8E:
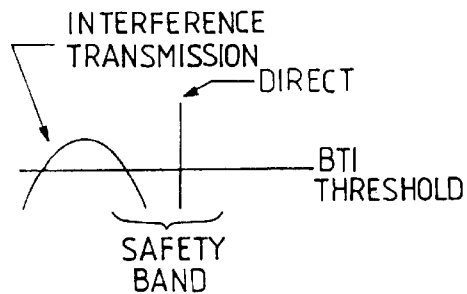
Figures 2, 8E:
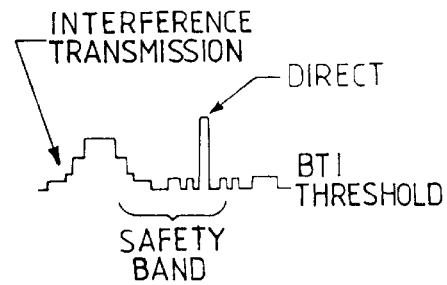

This situation corresponds to the case for FIG. 8A (in the following text, we shall refer without distinction to FIGS. 8*i*-1 and 8*i*-2, in which i=A to G), in which we will also find, in the central output compartment of the FFT (please refer more particularly to FIG. 8*i*-2) the contribution of a direct signal together with a powerful reflexive signal. The "line of sight" cannot be consistently defined. This situation, regarding a GPS receiver installed on board an aircraft, may in particular arise over a lake of water or of oil, at low or average height, which will transpire in the form of a reflection close to the direct signal. There may be added a spectrum base or additional strong lines.

The remainder of the mechanism in FIG. 7 gives rise to:
the various compartments of the FFT designated by an index i,=to c for the central compartment in which there is to be found the direct signal corresponding to the line of sight,
a range called the "safety band" centred on the central compartment whose width with regard to the safety range will beneficially correspond to substantial rejection by the carrier wave tracking loop, i.e typically −10 dB; $PBS_i$ is the designation given to the power received in compartment i of the safety range, where i is between c−s and c+s, theoretically excluding its central compartment (i does not=c);

A range called "lateral bands" corresponding to the remainder of the FFT compartments, i.e. j <c−s or j>c+s; $PBL_j$ now indicates the power (or level) obtained in compartment j of one of the two lateral bands located on either side of this safety band, Magnitudes of thresholds BT0 and BT1, defined in relation to thermal noise, where BT1>BT0. Typically, BT0 is defined on the basis of the number of points of the FFT, and possibly due to the fact that we shall have calculated the mean value of several squares of moduli of successive FFT's. BT1 is selected for purposes of net definition of a "high level" in relation to B0, as we shall see further on. In certain cases, it may be advantageous for these threshold values BT0 and BT1 to be rendered dynamic.

For each of the compartments with the exception of the central compartment index c, test 2020 (FIG. 7) relates to the fact that power $PBS_i$ crosses threshold BT0 in at least one of the FFT compartments of the safety band (for example, please refer to FIGS. 8B and 8D). If there is no such crossing (outside of the central compartment), then stage 2021 will confirm that the phase and speed data is valid, whilst the status of the distance information remains to be determined. On the other hand, if $PBS_i$ exceeds threshold BT0 in at least one of the FFT compartments under consideration (outside of the central compartment), then stage 2022 will establish that the phase data is invalid and that the distance data is in principle invalid, whilst the status of the speed data remains to be determined.

We shall now consider the output of stage 2021. Test 2031 also aims to determine whether, within at least one of the lateral band compartments, $PBL_j$ exceeds threshold BT0. If the answer is in the negative, then stage 2032 will establish that the range data is valid and we shall pass directly to final stage 2090. In this case, in fact, all of the compartments of FFT apart from the central compartment are below threshold BT0.

If test 2031 indicates that $PBL_j$ exceeds level BT0 in at least one of the lateral band compartments (FIG. 8C), then stage 2033 will establish that the distance information is invalid, subject to the possible correction which will be discussed below.

This may correspond to powerful isolated reflection in an FFT compartment of lateral bands (FIG. 8C). This case is encountered when an aircraft performs a turn above the ground, which comprises a fixed reflective object and producing a Doppler shift from the point of view of the aircraft.

If, on the other hand, this Doppler shift is low, then the powerful reflective line will then be within the safety band (FIG. 8D) and will have caused transfer to stage 2022.

Now, to return to the output of stage 2022. A test 2041 compares the level in each one of the compartments of the safety band, except for the central compartment with threshold BT1 which is greater than BT0. This test is therefore aimed at enquiring whether there is a high-level crossing of the threshold in the safety band outside of the central compartment.

If the answer is in the affirmative, then stage 2042 will determine that the speed data is also invalid, and we will pass to final stage 2090.

If the answer is in the negative, then stage 2043 will concede that the speed data is valid inasmuch as logic signal IRBP indicates that the rejection implemented by the carrier-wave loop is correct.

Figures 1, 8F:
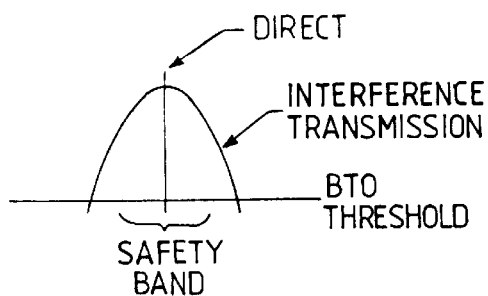
Figures 2, 8F:
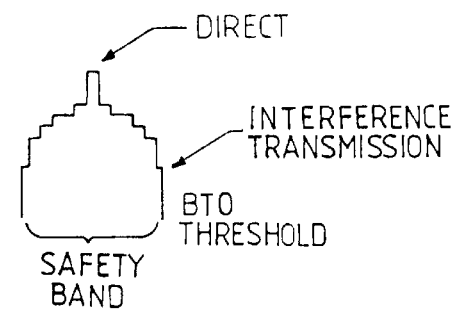

To consider the case in which an interference source close to the receiver causes interference, but without serious modification to the input power of the receiver: If this interference transmission is lateral (FIG. 8E), then it exceeds threshold BT0 but not threshold BT1 within the safety band, and is not comparable to a diffuse reflection; hence in this instance passage via stage 2043. If, on the other hand, the interference transmission exceeds threshold BT1 in the safety band (FIG. 8F), then we pass via stage 2042.

From stages 2033 or 2043, it is possible to pass directly to final stage 2090. FIG. 7 illustrates an optional variant to which we shall return later on.

We shall now consider time analysis in the tracking mode.

In FIG. 6, the output of deviation measurement stage 50 with a phase locking loop (PLL) for the code loop supplies a deviation variable D_B.

Channel C receives repeat C2 (893 E minus 893 L); thus it has the same centre as channel B, but a greater spacing, since the time offset between 893 E and 893 L is greater than that between 892 E and 892 L. Deviation measurement unit 60 (identical to unit 50 apart from the spacing between the partitions sub-dividing the spacing) sets up a deviation variable D_C on the basis of phase components I_C and quadrature components Q_C available at the output of channel C.

Furthermore, a subtractor 61 sets up difference $$Z=D\_B-D\_C.$$

Figure 10:
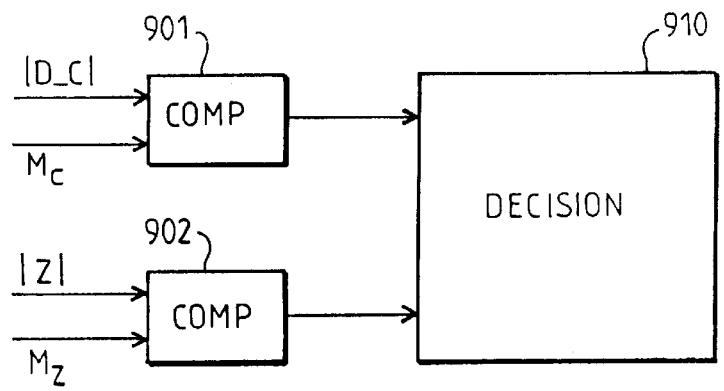
FIG. 10 provides a diagrammatical illustration of the time analysis base media as per the invention.

Time analysis comprises monitoring of signal module D_C (or of its square) and/or monitoring of the module for signal Z (or of its square). FIG. 10 shows that these modules /D_C/ and /Z/ are compared (901, 902) to respective thresholds Mc and Mz. A decision-making module 910 utilises the threshold overshoot in order to set up an indication of the presence of multiple paths, as we shall see further on. Although current preference accrues to utilisation of the two signals D_C and Z, it is possible to envisage utilisation of one alone of these two signals, at least for certain applications. In practice, elements 901, 902 and 910 are part of management/decision-making unit 90. Furthermore, the invention does not exclude monitoring of signal module D_B (or of its square), particularly in a receiver which has no channel C. The deviation measurement width of channel B can therefore be increased.

It is recalled that signals D_B and D_C result from integration over a high number of individual correlations. This integration may range from a few hundred milliseconds to several seconds, depending on the dynamics of the phenomenon of multiple paths for the application under consideration. Furthermore, since the spacing of channel C is markedly wider than that of channel B, the contribution of noise in signal D_C is markedly greater than that of the noise in signal D_B.

As a non-exhaustive consideration, let us now envisage that x and y are selected in order to correspond to spacings of 0.2 chip and one chip respectively for channels B and C. Value 2x may decrease to approximately 0.1 chip; with regard to y, we observe fairly rapid attenuation after one chip. Preferably, y is also taken as large as possible in relation to x.

Channel B supplies distance tracking (on the code), via the scalar product and standardisation obtained on the basis of Channel A. After a transitory regime of varying length, the slaving performed by the code loop theoretically always finds a position of equilibrium, at least if we are working on the basis of the scalar product.

Once the window or the time deviation measurement facility for Channel B, strictly of 2.x spacing, receives only the direct path, then variable D_B is at 0, apart from the noise, where the slaving provided by the code loop is stabilised (as summarised within block 50). Under these conditions, since channel C has the same centre, variable D_C is also at 0, apart from noise, but subject to the reservation that the window or time deviation measurement facility for channel C, with a spacing of 2.y in relation to 2.x, also receives only the direct path.

Tracking is referred to as canonical where there is only one direct path, and nothing else (apart from noise) between the transmitter (the satellite) and the receiver. In this instance, the direct signal is associated with a delay tauD (in relation to local time base) which is normally adjacent to the centre t (circumflex) of channel B. This signal will have the same contributions to channel B and to channel C, because it enters the windows of these two channels simultaneously.

On the other hand, in a situation of multiple paths, direct signal SD is accompanied by a reflected signal SR, at least. In respect of tR, we note the delay in the reflected path, and in respect of dRD we note difference tR−tD. The work which the Applicant has performed has enabled it to arrive at several findings:

a) If two GPS signals with the same satellite code, for example one of them being direct and the other reflected, are simultaneously present within one and the same deviation measurement facility (channel B and/or C), then the latter adopts a position of equilibrium (circumflex) which is simultaneously different from delay tD of the direct path and delay tR of the reflected path. The module of the output of this deviation measurement facility, apart from noise, differs from 0 to the same degree that the phase offset between direct signal SD and reflected signal SR differs more greatly from kpi (entire value of k and phases defined in relation to the carrier-wave frequency, including Doppler). An initial possibility of detection of anomaly (indication of the presence of multiple paths) can therefore be provided by the fact that the output module for this deviation measurement facility exceeds a threshold. This threshold takes account of the anticipated or measured noise level; it is markedly proportional to integration time; furthermore it takes account of a permitted error risk ("false alarm probability" or Pfa). At this stage, it is possible to use signals D_B and/or D_C.

b) If the two GPS signals are accurate to kpi (either in phase or in opposite phase), then equilibrium position t (circumflex) which is reached by the deviation measurement facility is such that the module value for its output is null. However, and the value of t (circumflex) depends on the deviation employed between the two partitions E and L of this deviation measurement facility. If we utilise two deviation measurement facilities, for the deviation between different partitions, and if we apply pilot control to tracking with the strict deviation measurement facility (as is the case here), then the wide deviation measurement facility, of the same centre, provides a module output other than 0, since its own position of equilibrium t (circumflex) does not correspond to t (circumflex). It is therefore possible to apply a second anomaly detection by referring to 2 deviation measurement facilities, one of them being narrow for tracking, and the other being wide for monitoring. It has also been observed that the deviation between the two equilibrium positions $t^1$ (circumflex) and t (circumflex) is greater in proportion to the phase offset pi than when it is 0 (accurate to 2 kpi). This is particularly interesting since deviation pi or the phase opposition situation is the most burdensome case.

c) Once we are no longer in steady mode, for example at the time of occurrence (rapid or not) of a reflected signal SR, or—again—in the presence of a significant frequency deviation between direct signal SD and reflected signal SR, it has been observed that the module of Z can advantageously replace or supplement the information given by the module of D_C, due to the fact that it contains less noise than the latter.

The following information is made taking account of noise.

This finding has been observed by the Applicant: once the code loop is functioning in a normal, stabilised manner on the the direct path alone ("canonical tracking" of code by means of channel B), then the contribution of the code loop residual positioning error in /D/C/ (module of signal D_C) is markedly below the content of noise in D_C (typically in a ratio of 10). Hence it is negligible.

We now propose to set for /D_C/ a threshold Mc whose crossing will indicate the presence of an additional path. This threshold can be set in relation to the anticipated noise level for channel C, and given an accepted error risk ("false alarm probability" or Pfa). The threshold is proportional to integration time.

For example, for seven available satellites, Pfa is 14%, if we accept rejection, on average, of a line of sight for each set of seven simultaneous measurements which can be used for calculation of one positioning. From this we can then deduce, by numerical calculation, the threshold to be applied to channel C, given the receiver's operating parameters.

If/D−C/ exceeds Mc, then management/decision-making unit 90 will then decide to invalidate the current line of sight. The same can be done with /D_B/4 channel B, as already mentioned above.

We can now see that signal Z contains valuable information with regard to the existence and amplitude of signals originating from paths other than the direct path.

In the case of canonical tracking, difference Z contains nothing but noise. However, the Applicant has observed that noise in /Z/=/D_B−D_C/ is less than the noise in /D_C/, which is typically approximately 20% for a ratio of 5 between y and x (y=5x).

It has transpired that within difference D_B−D_C, the noise of D_B is partially subtracted from the noise of D_C: in the common section of the windows for channel C and for channel B, there exists a noise component which is dependent on positioning and deviation, and is thus different in both of the channels, but also there is a noise time base which is the same and which disappears by subtraction. In other words, it is by their different spacing that they are more or less de-correlated from the outputs of the two correlators for channels B and C.

Figure 9C:
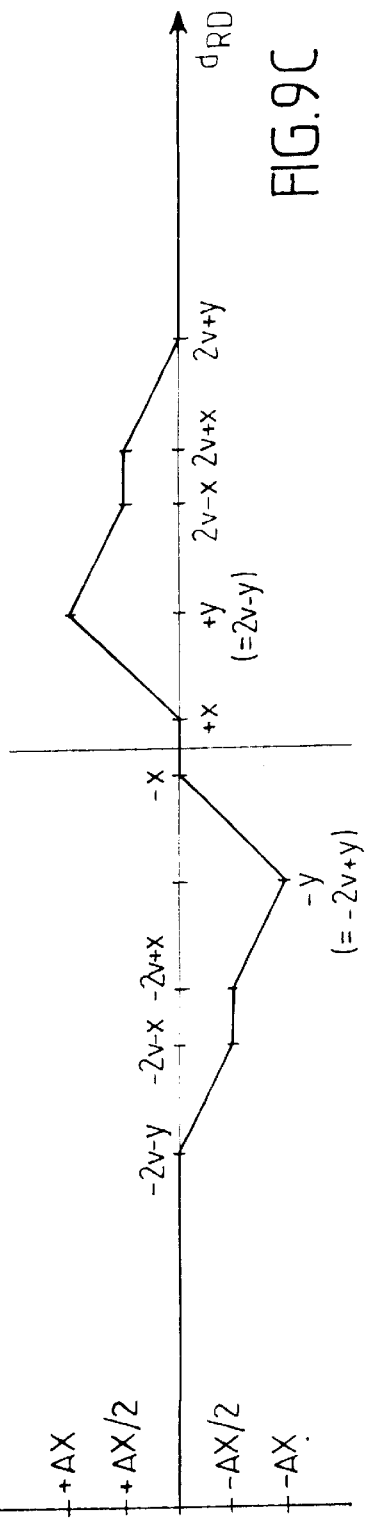

In FIG. 9C, the abscissa represents time deviation dRD (with no preoccupation with scale), whilst the ordinate represents /Z/, at a scale which is defined as follows:

$$AX = A_R(1 - x/v)$$

Where $A_R = N\, a_r\, 0.6/\mathrm{sigma}$, where $a_r$ is the true amplitude of reflected signal SR, as received, N is the number of sampling points (product of sampling frequency Fe by integration time dt), and sigma is the typical deviation of noise in the wanted band at the output of the receiver's input stage.

In FIG. 9C, we further consider that the direct signal is still comprised within the deviation measurement facility for channel B, whilst the reflected signal will "sweep" the time interval of the deviation measurement facility for channel C.

If $d_{RD}$ is equal to or less than ±x, then the reflected signal (SR) and the direct signal (SD) will have the same contributions in channel B and in channel C. Difference Z therefore comprises only noise. This is illustrated by FIG. 9C between the abscissae −x and +x.

For the rest, the Applicant has observed that:

Where $d_{RD}$ is comprised between +x and 2.v−y, there remains an increasing contribution due to reflected signal SR in channel B, which—together with the contribution of SR in channel C—produces an increase up to a maximum value +AX;

Where $d_{RD}$ is between 2.v−y and 2.v−x, the situation is the same as above except that the resultant becomes a decreasing value, descending from +AX to +AX/2;

Where $d_{RD}$ is comprised between 2.v−x and 2.v+x, there is no longer any increasing contribution due to reflected signal SR in channel B. Its contribution in channel C decreases to 0;

Finally, past 2.v+y, reflected signal SR is no longer perceived by channel C.

Naturally, the curve is symmetrical in relation to the point (0.0), for negative values of dRD (in certain applications, it may arise that a "reflected" signal, or similar signal, essentially a red-herring signal, arrives before the "direct" signal.

For satisfactory understanding of FIG. 9C, it is necessary to take account of the following elements:

We have traced the module of difference D__B−D__C,

Distance tracking on channel B is performed in relation to what is "seen" by channel B of the resultant of signals $S_D$ and $S_R$, We have assumed that $\tau_D$ is comprised between −x and +x, Furthermore, the illustration in FIG. 9C assumes that the value of 2.y corresponds to one chip, i.e. y=v; otherwise, the possible monitoring interval is decreased.

It transpires from the above that the presence of a reflected path in addition to the direct path, and at more than x time units of this direct path, is reflected in signal Z by a continuous component, which exceeds the noise level contained by this signal.

Application of a threshold Mz appropriately selected from signal Z makes it possible to identify the presence of multiple paths in channel C and/or B, and to derive the corresponding consequences concerning the correct operation of channel B, plus the code loop for which it provides pilot control. One non-exhaustive means of fixing this threshold Mz consists of taking the threshold Mc envisaged for signal D__C itself, modified in proportion to the ratio of the respective noise levels of D__C and of Z (80% if the noise in Z is 20% below noise in D__C). Thus, signal /Z/ is in turn a good indicator of the existence of multiple paths.

A further factor to be taken into account is the "frequency dynamic" or "carrier-wave dynamic" of the incoming signal. In the case of high relative acceleration, there arises a carrier-wave frequency offset. Tracking loops support this frequency dynamic within the limits of their pass band. However, this will result in a delay or "lag" in these loops' response. And this lag sets up a continuous component which appears in signals D__B and D__C, and can, for example, bring about a situation in which /D__C/ exceeds threshold Mc in the presence of a high relative acceleration where pass bands are no longer suited to the dynamics of the receiver—which corresponds to incorrect utilisation by the operator—and where there is no multiple path. On the other hand, it will be observed that signal Z, for its part, is free of this lag, by way of difference. Therefore, it is still possible, in consideration of signals D__C and Z, of their respective thresholds and of the tracking loop operating conditions (particularly logic signal ITPP mentioned above), to obtain a reliable indication of the presence of multiple paths. It will be noted that signal ITPP can be supplied by the fact that frequency detection provides the main signal not in the central compartment but in one of the adjacent compartments (or one which is above the adjacent compartments). The proposed double deviation measurement facility structure is therefore particularly valuable in itself, for this purpose.

The results of frequency analysis and/or time analysis make it possible to achieve selective differentiation between measurements (1 "line of sight", or several) identified as being partially or totally doubtful, under this invention. The indicators set out here therefore provide an advantageous supplement to the indicators (independent of multiple path) which are already utilised in known receivers for elimination of a line of sight which produces a dubious measurement.

We now go on to consider the case of partial invalidation in which, for example, only the "speed"remains valid. In this instance it remains possible to utilise partially valid information for resolution of navigation equations depending on the required precision, otherwise the line of sight is invalidated.

Time analysis, in conjunction with frequency analysis, provides a very valuable additional means for detection of the presence of reflected paths. By means of this detection, we can invalidate all measurements corresponding to the relevant line of sight.

In fact, frequency analysis makes it possible to separate reflected signals from the direct signal where the distance in atmosphere between the reflector and the receiver is variable (Doppler shift other than 0). This, for example, is the case for an aircraft in flight which is rising or sinking in relation to a reflective terrain, or will also be the case for a ground vehicle emerging alongside a potentially reflective surface which is not parallel to the speed vector of the vehicle.

Furthermore, the above-described time analysis provides information in a situation where frequency analysis is not very effective, i.e. where the Doppler shift is low or non-existent between the direct signal and the reflected signal or signals. This will typically be the case for an aircraft in flight which is horizontal in relation to a reflective terrain, or—again—for a stationary receiver (fixed in relation to reflective surfaces).

It will be noted that these two modes of processing are conducted entirely in parallel with no multiplexing of correlations and other slaving functions. They also make it possible to process multiple paths both of the diffuse type and of the reflected type, which has not been made possible, to date, by any other technology.

Frequency analysis is particularly effective for diffuse multiple paths, and as such is valuable in itself. More specifically, diffuse paths exert an influence on the form of the correlation functions of codes in a manner which is dependent on the speed of the receiver platform, hence the need for a short analysis time. In this instance, frequency analysis bears full effect.

By way of comparison with the above described time analysis, it has already been proposed to perform partial analysis of the form of the correlation curve, particularly in FR-A-2 698 966. In order to take this analysis to greater depth, we should either envisage a large number of correlators, which is laborious or—if we have only a limited number of correlators—successively offset them in time and envisage a high analysis time, furthermore supposing that the form of the correlation curve is stable throughout this analysis time, at least. Comparatively, double deviation measurement technology analysis (channels B and C), as proposed, is simple, immediate and not dependent on the assumption of a stable form in the correlation curve over a long time interval.

As we have seen, the combination of frequency analysis and time analysis makes it possible to reject measurements in a highly discriminatory fashion:

If there is frequency detection of multiple paths, whether reflective and/or diffuse, then distance measurement over the envisaged line of sight is deemed invalid as a precaution, If the Doppler shift is low, then speed and phase measurements originating from the carrier-wave loop are deemed invalid, If the Doppler shift is high, on the other hand, we consider that the speed and phase measurements originating from the carrier-wave loop are invalid, If there is detection of multiple paths by time analysis, the precaution is taken of considering that all of the corresponding measurements are invalid.

Although the basic concept of the invention consists of detecting the presence of multiple paths, it is nonetheless possible to try to correct them, in certain cases at least. FIG. 7 provides an example of such optional correction.

With this correction option, on the basis of stages 2033 or 2043, we shall culminate in test 2051, which starts from the basis of a variable logic IPS (Indicator of Possibility of Return to Ground), which indicates whether it is possible in the context of altitude and elevation to observe multiple paths on the present line of sight. This operation must take account of the following relationship:

$$2.H.\sin\Theta < \delta Dmin,$$

Where H is altitude, theta is the angle of incidence of waves on the receiver in relation to the horizontal ("elevation"), and δDmin represents a limit deviation between the direct signal and the reflected signal, over and above which, any disturbance will cause no greater meaningful bias in terms of distance. This variable δDmin is established on the basis of the spacing of the differential correlator employed in channel B; δDmin typically corresponds to 2.50 m in the example described. H and Θ for their part, can be determined, if necessary, by means of instruments on-board an aircraft. A an adequately close approximation of H can be obtained by means of all measurements (even those which are polluted by multiple paths). And Θ can be calculated precisely because the positioning obtained by means of all measurements will be incorrect at most by 100 to 200 m, which in angular terms is negligible given the minimum satellite/receiver distance of 20,000 km. Incidentally, it will be noted that H is height in relation to the geoid, and that access is gained to it only if the memory contains the height of the geoid in relation to WGS 84 in the overflown zone, for example 50 m in the Atlantic Ocean opposite les Landes.

If IPS is incorrect, then the distance remains invalid as defined at stage 2033, and we pass to final stage 2090.

Figures 1, 8G:
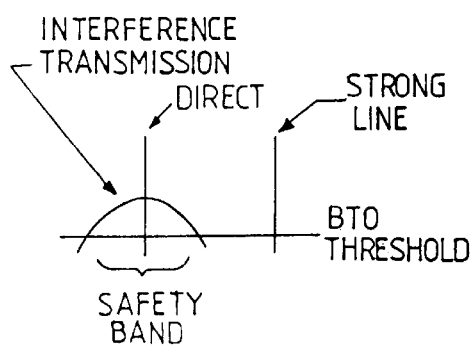
Figures 2, 8G:
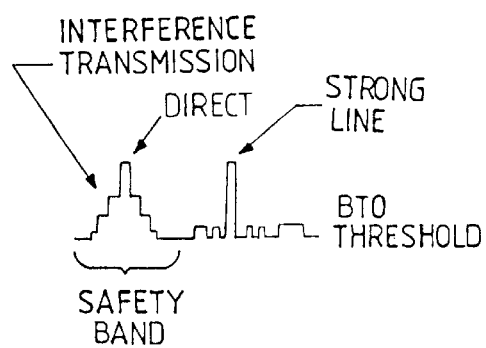

Otherwise, we pass to the following test 2053. This test relates to the existence of FFT compartments with crossing of threshold BT0 (apart from the central compartment), but which remain isolated. This characteristic of isolation can then officially be determined by the fact that—for each compartment which is crossed—the two adjacent lower compartments and the two adjacent upper compartments, on the other hand, are not the subject of crossing of noise level BT0. If the reply is in the affirmative (isolated compartment), then the IPR signal is true, and we pass to final stage 2090. This corresponds in particular to the case illustrated in FIG. 8G, which we also encounter in 8D and in 8C.

Otherwise, test 2054 sets out to determine whether there exists a single series of non-isolated compartments, being the subject of crossing of threshold BT0,and maintaining a substantial contrast between the direct signal and the signal which is contained in each of these compartments. Furthermore, the central frequency which can be defined over all of these compartments crossing threshold BT0 must remain relatively close to the central compartment. If all of this is false, then we pass directly to final stage 2090, and the distance value is still deemed invalid. Otherwise, it is possible to envisage, at stage 2055, correction of distance according to the integral of the energy in this series or "continuum" of compartments surrounding the central compartment and possessing a central frequency which is relatively close to that of the central compartment. This situation corresponds to the diagram set out by FIG. 8B (in FIG. 8F, contrast is inadequate).

The invention is not limited to the above described mode of procedure, with particular reference to the three-channel receiver on the basis of which the invention is described here. A higher number of channels is not excluded. In certain representative cases, it would be possible to envisage inversion of the functions of channels B and C, and it would also be possible to envisage that these channels did not have the same centre (between themselves or for channel A), particularly to take account of the fact that the natural reflected paths are subsequent to the direct path. In more general terms, the invention can be extended to other radio location systems (or—more generally—radio navigation systems) than GPS, whether they are based on satellites, as is the case for the GLONASS system or Earth-based. In the case of the GLONASS system, it is known that the satellites utilise different carrier-wave frequencies, with double-phase modulation by a pseudo-random code which is common to them; professionals in this field will be capable of making the necessary adaptations for implementation of this invention.

Here, furthermore, we use waves to localise the receiver; a variant application consists of re-transmitting waves with a time marker as a function of the time data obtained by reception. It would also be possible, for example, to apply the invention to reference stations (whose position is known in advance), making it possible for mobile GPS receivers in the vicinity to operate in a differential mode, although the economic constraint is far less applicable to the design of such reference stations and even though other media could consequently be envisaged, in this latter case.

What is claimed is:

1. A device for reception of radio-electrical signals comprising a modulated carrier-wave, and equipped with a repetitive time marker, of the pseudo-random code type, with particular reference to radio-navigation, where the device comprises high-frequency reception, which produces a wanted signal with several coincidence modules, each of which is allocated to a time offset in relation to a selected respective radioelectrical signal, and means for analysis of the time offset data supplied by these coincidence modules, and wherein each coincidence module comprises:

chronometric memory media suitable for storage in the form of time offset data of a code offset estimate and a frequency carrier-wave status and phase estimate, and the corresponding deduction, with a local clock, of a local carrier-wave image and at least one local repeat of the code for the relevant radioelectrical signal, and code and carrier-wave slaving functions operating by correlation between the wanted signal and the local code repeat, and also by means of a frequency and phase offset signal between the carrier-wave present in the wanted signal and the said carrier-wave image for purposes of bringing about coincidence between the local code repeat and the received code, wherein said device comprises Fourier transformation media receiving the carrier-wave frequency and phase offset signal and decision-making media which are capable of invalidating, at least partially, the time offset data where the Fourier transformation indicates the presence of energy outside of the vicinity of a central line corresponding to coincidence, which provides an indication of the presence of multiple paths.

2. The device of claim 1 wherein the decision-making media are managed for purposes of validation of carrier-wave frequency and phase estimates, where the energy level obtained within a safety band adjacent to the central line, where that line is excluded, remains less than a reference level.

3. The device of claim 2, wherein the decision-making media are managed for purposes of validation of the code offset estimate where the level of energy obtained within the bands lateral to the safety band remains less than a reference level.

4. The device of claim 2 wherein the decision-making media are managed for purposes of invalidation at least of the carrier-wave phase estimate, where the level of energy obtained in the said safety margin, to the exclusion of the central line, exceeds the reference level.

5. The device of claim 4, wherein the decision-making media are managed for purposes, furthermore, of invalidating the carrier-wave frequency estimate and the code offset estimate, where the energy level obtained in the safety band exceeds a second reference level which is greater than the first.

6. The device of claim 4 wherein the decision-making media are managed for purposes of validation of the carrier-wave frequency estimate where the energy level obtained in the safety band does not exceed the second referenced levels, subject to the condition of satisfactory operation of the carrier-wave slaving loop.

7. The device of claim 2, wherein the decision-making media are managed for purposes of validation of the code offset estimate, where overshoots over the said threshold within safety margin fulfil the predetermined conditions relating to at least one of the following properties: continuity, centring and non-overshoot of the second threshold.

8. The device of claim 1, wherein the media constituting the chronometric memory comprise a carrier-wave oscillator for definition of the carrier-wave local image, a code oscillator and a generator with at least one local code repeat.

9. The device of claim 1, wherein the code and carrier-wave slave control functions comprise:

a discrete correlation channel, comprising de-modulation according to the said carrier-wave image, and supplying a coincidence signal between the time position of the code in the wanted signal and its code encryption estimate, at least one differential correlation channel, comprising de-modulation in accordance with the said carrier-wave image, and supplying an offset signal between the time position of the code in the wanted signal and its code encryption estimate, the coincidence signal providing the offset variable for a phase-lock carrier-wave loop which provides pilot control of the generator of the carrier-wave local image, and the code deviation signal providing the offset variable for a delay-locked code loop whose output is combined with that of the phase-lock carrier-wave loop for purposes of pilot control of the code repeats generator.

10. The device of claim 9, wherein decision-making media are managed to set up a further indication of the presence of multiple paths by recourse to the offset signal originating from at least one differential correlation channel.

11. The device of claim 10 wherein the coincidence module comprises at least one second differential correlation channel, and that decision-making media are managed in order to set up a further indication of the presence of multiple paths by recourse to the offset signal originating from this second differential correlation channel.

12. The device of claim 11 wherein the second differential correlation channel possesses the same centre as the first.

13. The device of claim 11 wherein the second correlation channel has a different spacing from that of the first.

14. The device of claim 13 wherein the first differential correlation channel has a spacing of less than one code step and the second differential correlation channel possesses a spacing greater than that of the first.

15. The device of claim 14 wherein the spacing of the first differential correlation channel is of the order of one tenth of a code step whilst the spacing of the second differential correlation channel is of the order of one code step.

16. The device of claim 11 wherein the spacings between the first and the second differential correlation channels are programmable.

17. The device of claim 11 wherein decision-making media are managed for purposes of establishing the other indication of the presence of multiple path on the basis of comparison between the offset signal originating from the second differential correlation channel and the offset signal originating from the first differential correlation channel.

18. The device of claim 17 wherein decision-making media are managed for purposes of establishing the other indication of the presence of multiple paths on the basis of the fact that difference between the offset signal originating from the second differential correlation channel and the offset signal originating from the first differential correlation channel exceeds another selected threshold.

19. The device of claim 17 wherein the said other indication of the presence of multiple paths established on the basis of difference takes account of the centring of frequency tracking as indicated by frequency analysis.

20. The device of claim 10 wherein decision-making media are managed for purposes of establishing the said other indication or indications of the presence of multiple paths where the offset signal originating from the differential correlation channel under consideration exceeds a selected threshold.

* * * * *